Patented June 29, 1954

2,682,554

UNITED STATES PATENT OFFICE 2,682,554

PREPARATION OF TRIALKYL TRITHIOPHOSPHITES

Willie W. Crouch and Robert T. Werkman, Bartlesville, Okla., assignors to Phillips Petroleum Company, a corporation of Delaware No Drawing. Application December 28, 1948, Serial No. 67,747

6 Claims. (Cl. 260—461)

This invention relates to the production of trialkyl trithiophosphites. In certain of its specific aspects it relates to an improved method for the formation of trialkyl trithiophosphites by reaction of phosphorus trihalides with alkyl mercaptans containing from 3 to 5 carbon atoms per molecule. One of the preferred embodiments of the invention pertains to the production of tritertiary butyl trithiophosphite.

The reaction of phosphorus trihalides with alkyl mercaptans to produce the corresponding trithiophosphites has long been known. The reaction is represented by the following formula:

$$PX_3 + 3RSH \rightarrow P(SR)_3 + 3HX$$

wherein R is an alkyl radical and X is a halogen, preferably chlorine, bromine, or iodine.

In the past this reaction has been effected in the presence of an inert solvent such as chloroform, ether, carbon tetrachloride, and the like. In view of the poor yields, it has been considered essential that an acid acceptor, such as dimethyl aniline or pyridine, be employed in the process in order to obtain significant yields. Naturally this leaves much to be desired from a practical and commercial view point in as much as the separation of the desired product, from the solvent on the one hand, and from the compound formed between the liberated hydrogen halide and the acid acceptor on the other hand, is difficult and expensive.

It is an object of this invention to provide an improved process for the preparation of trialkyl trithiophosphites.

Another object of the invention is to react alkyl mercaptans having 3, 4, or 5 carbon atoms per molecule with phosphorus trichloride, phosphorus tribromide, or phosphorus tri-iodide to form the corresponding trialkyl trithiophosphite.

A further object of the invention is to prepare a trialkyl trithiophosphite in improved yields.

Another object of the invention is to accomplish the preparation of trialkyl trithiophosphite in the absence of extraneous solvents.

Another object of the invention is to permit recovery of trialkyl trithiophosphites prepared by reaction of phosphorus trichloride with alkyl mercaptans in a much simpler manner than has heretofore been possible.

A still further object of the present invention is to make possible the production of trialkyl trithiophosphites having 9 to 15 carbon atoms per molecule in high yield without the necessity of employing an added acid acceptor.

Further objects and advantages of the invention will be apparent, to one skilled in the art, from the accompanying disclosure and discussion.

We have found that the disadvantages of the prior art mentioned heretofore may be avoided and high yields of trialkyl trithiophosphites obtained if a phosphorus trihalide selected from the class consisting of phosphorus trichloride, phosphorus tribromide and phosphorus tri-iodide, preferably the trichloride, is reacted with an alkyl mercaptan having 3, 4, or 5 carbon atoms per molecule, or a mixture of two or more of these mercaptans, provided the said mercaptan is employed in considerable excess over the stoichiometric quantity required for the reaction. We use at least 4 mols of mercaptan per mol of phosphorus trihalide, thus providing at least one mol of mercaptan in excess of the 3 mols constituting the stoichiometric requirement for the reaction. It is preferred, and superior yields are obtained, if from 5 to 6 mols mercaptan per mol of phosphorus trihalide are employed, although even large quantities ranging up to 10 mols mercaptan per mol of phosphorus trihalide are advantageous. The preferred range is from 4 to 8 mols mercaptan per mol of phosphorus trihalide. It has been found that the use of only a slight excess of mercaptan, i. e. appreciably less than one mol in excess, shows little advantage and has appreciable disadvantages; at the other extreme, a diminution in yield is observed when the mol ratio of mercaptan to phosphorus trihalide exceeds about 8:1. As will be shown hereinbelow, optimum yields are realized when this ratio is in the range of 5:1 to 6:1.

We have found that when operating with only the stoichiometric amount of mercaptan (3:1 mol ratio), or with a small excess such as less than four mols mercaptan per mol of phosphorus trichloride, considerable amounts of an oily byproduct are formed which contaminates the product and is of itself of little commercial value. However, by operating in the preferred range of the present invention, such oily contaminants are reduced to practically negligible amount.

In a preferred embodiment the process of the present invention is carried out as follows. Phosphorus trichloride and an excess of a $C_3$ to $C_5$ alkyl mercaptan in the range stated herein above are placed in a reaction vessel and mixed at room temperature. The temperature is then raised to the boiling point of the anhydrous mixture and reflux is maintained. A condenser is arranged to return the mercaptan and any phosphorus trichloride vaporized to the reaction vessel, and the by-product HCl is withdrawn as formed. After the evolution of HCl ceases, excess mercaptan is distilled off, preferably by vacuum distillation, and the product, trialkyl trithiophosphite, is purified, if desired, by crystallization with acetone in the case of the tritertiary butyl or other normally solid derivatives. The normal propyl and normal butyl derivatives are low-melting solids, and are recovered as still residue after distillation of the unreacted mercaptan, or may themselves be distilled overhead by vacuum distillation from any heavier by-products which may be present. The tritertiary butyl trithiophosphite melts at 91 to 92° C. and is thus recovered as a solid.

While normally we prefer to carry out the reaction under reflux, this is not essential so long as a temperature adequate to cause the reaction to go is maintained, and such temperature is normally found within the range of 10 to 135° C. If a temperature lower than reflux temperature is employed, it is preferred that suitable agitating means be provided within the reactor. While the reaction may be effected under pressure this is somewhat undesirable and it is preferred to carry out the reaction at atmospheric or sub-atmospheric pressure with constant withdrawal of hydrogen chloride as liberated. We have found that an important advantage of our invention lies in the fact that by so withdrawing the gaseous hydrogen chloride or other hydrogen halide as soon as formed we are able to dispense entirely with added acid acceptors in the nature of alkaline materials such as amines and the like, although the use of such materials is not outside the broad scope of our invention. The reaction is carried out until formation of the trialkyl derivative is reasonably complete, and this normally occurs in a time not in excess of 20 hours. Frequently 10 hours is adequate, and in some instances a shorter reaction time is sufficient.

The products of this invention are useful as ore flotation agents, additives in rubber compounding, parasiticides, acid inhibitors, mineral oil additives, and chemical intermediates for various syntheses.

The following examples are offered to illustrate specific preferred methods of carrying out the invention and to illustrate various of the advantages of the invention. It will be understood of course that the particular conditions and reactants used are only examples and are not necessarily exhaustive of the invention in its broadest scope.

*Example I*

One-third of a mol (45.8 grams) of phosphorus trichloride and 1.67 mols (150 grams) of tertiary butyl mercaptan (1.67 times the stoichiometrical amount of 5 mols mercaptan per mol of phosphorus trichloride) were placed in a one-liter three-neck flask provided with a reflux condenser, air bleed, and thermometer.

A slight vacuum (725 mm. Hg) was drawn on the system to facilitate the withdrawal of hydrogen chloride formed in the reaction. It was further arranged that the HCl was drawn through distilled water which, by titration with standard sodium hydroxide, gave a rough check on the progress of the reaction.

Apparently there was no reaction until the temperature was raised to 50-55° C. Sufficient heat was applied to cause gentle reflux at about 65° C.

After 8 to 10 hours the evolution of hydrogen chloride had practically ceased, but the refluxing was continued until 18 hours had elapsed. The reaction mixture was then transferred to a distilling flask and the excess mercaptan distilled off under vacuum.

A crude yield of 82 per cent (based upon the phosphorus trichloride) of white crystalline product remained after distilling off the excess mercaptan. This was recrystallized from acetone to give a 78% yield of pure tri-tert-butyl trithiophosphite. The purified product analyzed 31.2% sulfur and 10.2% phosphorus (theoretical: 32.2% and 10.4%, respectively). The melting point is 91-92° C. The product is insoluble in water but soluble in the common organic solvents.

*Example II*

In a series of runs made according to the method of Example I, varying ratios of tertiary butyl mercaptan to phosphorus trichloride were used. In all the runs the reactants were maintained in steady reflux for 18 hours. Refluxing was initiated at from 65 to 75° C., and the approximate final temperature attained in each run is indicated in the table below. Excess mercaptan was removed under reduced pressure at the end of each run. Data for the runs are as follows:

| Run | Final Temperature, Degrees C. | Mol Ratio t-C$_4$H$_9$SH/PCl$_3$ | Crude Product Yield (Percent) Based on PCl$_3$ |
|---|---|---|---|
| 1 | 105 | 3 | 17.0 |
| 2 | 105 | 4 | 52.0 |
| 3 | 95 | 5 | 82.0 |
| 4 | 90 | 6 | 79.9 |
| 5 | 90 | 9 | 64.8 |

It will be noted that run 3 listed above is the run described in detail in Example I.

*Example III*

To ascertain the effect of an inert solvent medium on the reaction, two runs were made in which carbon tetrachloride was employed for this purpose. Reaction conditions were maintained the same as in Example II in other respects. The quantity of carbon tetrachloride solvent used in runs 6 and 7 listed in the table below was 6.2 mols per mol of phosphorus trichloride in each run. Final temperatures in run 6 were in the range of 76 to 105° C. and in run 7 were in the range from 76 to 90° C.

The results of these runs with added solvent, together with parallel runs made according to the process of the present invention, are shown below. It will be noted that under these conditions the presence of the solvent is actually detrimental.

| Run | Solvent | Mol Ratio t-C$_4$H$_9$SH/PCl$_3$ | Crude Product Yield (Percent) Based on PCl$_3$ |
|---|---|---|---|
| 6 | Carbon tetrachloride | 4 | None |
| 7 | do | 9 | 31.0 |
| 2 | None | 4 | 52.8 |
| 5 | None | 9 | 64.0 |

We claim:
1. A process which comprises reacting a phosphorus trihalide selected from the group consisting of phosphorus trichloride, phosphorus tribromide, and phosphorus tri-iodide with from five to eight mols per mol of phosphorus trihalide of an alkyl mercaptan containing from three to five carbon atoms per molecule in the absence of an added solvent for such a temperature and time as to produce the corresponding trialkyl trithiophosphite.

2. A process which comprises forming an initial reaction mixture consisting of phosphorus trichloride and an alkyl mercaptan having from three to five carbon atoms per molecule in the absence of an added solvent, the mol ratio of mercaptan to phosphorus trichloride being within the range of 5:1 to 6:1, and subjecting said reaction mixture to reaction to form the corresponding trialkyl trithiophosphite.

3. A process for the formation of tritertiary butyl trithiophosphite in high yield which comprises reacting rom 5 to 6 mols of tertiary butyl mercaptan per mol of phosphorus trichloride under refluxing conditions in the absence of an extraneous solvent while withdrawing gaseous hydrogen chloride from the reaction mixture as rapidly as formed, for a period of time sufficient to convert about 80% or more of the phosphorus trichloride to crude tritertiary butyl trithiophosphite, distilling off the remaining excess tertiary butyl mercaptan from the reaction mixture to obtain the crude product as residue, and recrystallizing the crude product to form pure tritertiary butyl trithiophosphite.

4. A process which comprises subjecting a phosphorus trihalide selected from the group consisting of phosphorus trichloride, phosphorus tribromide, and phosphorus tri-iodide plus at least five mols per mol of phosphorus trihalide of an alkyl mercaptan containing from three to five carbon atoms per molecule in the absence of a solvent to a temperature in the range of 10 to 135° C. causing liberation of hydrogen halide, withdrawing gaseous hydrogen halide from the reaction mixture as rapidly as formed until evolution has ceased, and recovering the resulting trialkyl trithiophosphite containing from three to five carbon atoms per alkyl group from the remaining unreacted mercaptan.

5. A process which comprises subjecting phosphorus trichloride plus at least five mols per mol of phosphorus trichloride of an alkyl mercaptan, containing from three to five carbon atoms per molecule in the absence of a solvent to a temperature in the range of 10 to 135° C. causing liberation of hydrogen chloride, withdrawing gaseous hydrogen chloride from the reaction mixture as rapidly as formed until evolution has ceased, and recovering the resulting trialkyl trithiophosphite containing from three to five carbon atoms per alkyl group from the remaining unreacted mercaptan.

6. A process which comprises reacting a phosphorus trihalide selected from the group consisting of phosphorus trichloride, phosphorus tribromide and phosphorus tri-iodide with an alkyl mercaptan containing from three to five carbon atoms per molecule in the absence of a solvent, the mol ratio of the total quantity of alkyl mercaptan employed to the total quantity of phosphorus trihalide employed being at least 5:1, at such a temperature and time as to produce the corresponding trialkyl trithiophosphite.

References Cited in the file of this patent

UNITED STATES PATENTS

| Number | Name | Date |
|---|---|---|
| 2,321,307 | Mikeska et al. | June 8, 1943 |
| 2,504,165 | Toy | Apr. 18, 1950 |

OTHER REFERENCES

Lippert, J. Am. Chem. Soc., vol. 60, pages 2370, 2371 (1938).